United States Patent
Enomoto

(10) Patent No.: US 6,456,442 B1
(45) Date of Patent: Sep. 24, 2002

(54) ZOOM LENS SYSTEM AND A FOCUSING METHOD THEREOF

(75) Inventor: Takashi Enomoto, Chiba (JP)

(73) Assignee: Asahi, Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/576,035

(22) Filed: May 23, 2000

(30) Foreign Application Priority Data

May 25, 1999 (JP) .......................................... 11-144819

(51) Int. Cl.$^7$ .............................................. G02B 15/14
(52) U.S. Cl. ...................................... 359/689; 359/684
(58) Field of Search ................................ 359/689, 686, 359/683–684, 676

(56) References Cited

U.S. PATENT DOCUMENTS

| | | | |
|---|---|---|---|
| 5,270,866 A | 12/1993 | Oizumi et al. ............... | 359/689 |
| 5,455,714 A | 10/1995 | Kohno ......................... | 359/689 |
| 5,566,026 A | * 10/1996 | Yoon ........................... | 359/689 |
| 5,574,599 A | 11/1996 | Hoshi et al. ................. | 359/689 |
| 5,666,229 A | 9/1997 | Ohtake ........................ | 359/683 |
| 5,815,320 A | 9/1998 | Hoshi et al. ................. | 359/686 |
| 5,850,312 A | * 12/1998 | Kato et al. ................... | 359/689 |
| 5,969,880 A | 10/1999 | Hasushita et al. ........... | 359/689 |
| 6,038,083 A | * 3/2000 | Sato ............................ | 359/689 |
| 6,246,529 B1 | 6/2001 | Sensui ......................... | 359/680 |
| 6,324,017 B1 | 11/2001 | Enomoto ..................... | 359/680 |

* cited by examiner

*Primary Examiner*—Jordan M. Schwartz
(74) *Attorney, Agent, or Firm*—Greenblum & Bernstein, P.L.C.

(57) ABSTRACT

A zoom lens system which includes a positive first lens group, a positive second lens group, and a negative third lens group, in this order from the object, and in which each of the three lens groups is independently moved, along the optical axis, upon zooming so that the distances therebetween become shorter; and the zoom lens system satisfies the following condition:

$$0.03 < (d_{12W} - d_{12T})/f_W < 0.15 \quad (1)$$

wherein
   $d_{12W}$ designates the distance between the most image-side surface of the first lens group and the most object-side surface of the second lens group, at the short focal length extremity;
   $d_{12T}$ designates the distance between the most image-side surface of the first lens group and the most object-side surface of the second lens group, at the long focal length extremity; and
   $f_W$ designates the focal length of the entire zoom lens system at the short focal length extremity.

4 Claims, 16 Drawing Sheets

FNO=3.8

-1.0   1.0
SPHERICAL
ABERRATION

CHROMATIC
ABERRATION

— d line
----- g line
- - - C line

W=28.3°

-0.05   0.05
LATERAL
CHROMATIC
ABERRATION

W=28.3°

-1.0   1.0
ASTIGMATISM

— S
--- M

W=28.3°

-5.0 (%) 5.0
DISTORTION

Fig. 3A
FNO=6.0
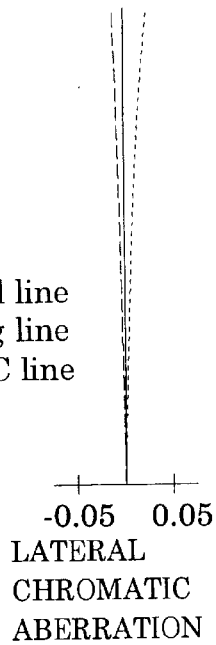
———— d line
-------- g line
— — — C line
-1.0  1.0
SPHERICAL
ABERRATION
CHROMATIC
ABERRATION
Fig. 3B
W=19.5°
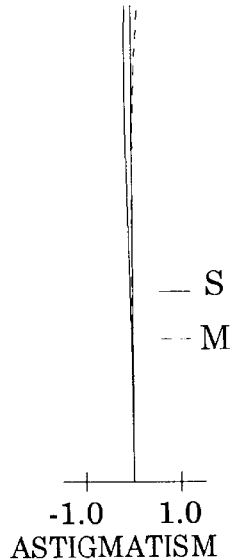
-0.05  0.05
LATERAL
CHROMATIC
ABERRATION
Fig. 3C
W=19.5°
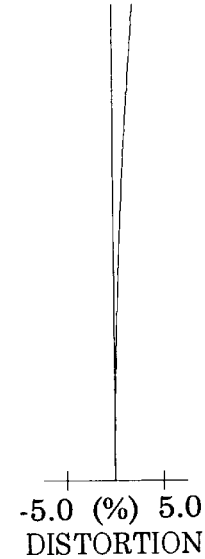
——— S
- - - M
-1.0  1.0
ASTIGMATISM
Fig. 3D
W=19.5°
-5.0 (%) 5.0
DISTORTION
Fig. 4A
FNO=10.9
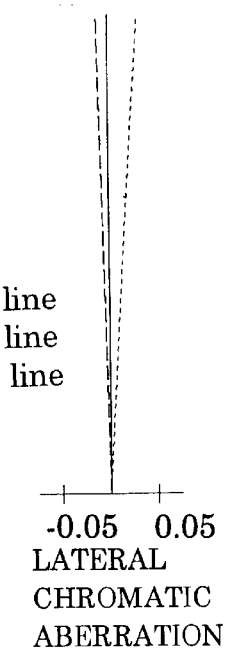
———— d line
-------- g line
— — — C line
-1.0  1.0
SPHERICAL
ABERRATION
CHROMATIC
ABERRATION
Fig. 4B
W=10.9°
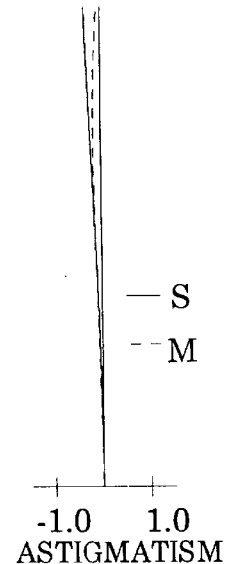
-0.05  0.05
LATERAL
CHROMATIC
ABERRATION
Fig. 4C
W=10.9°
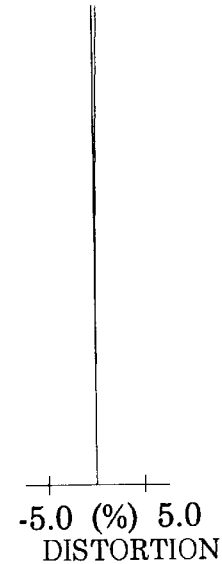
——— S
- - - M
-1.0  1.0
ASTIGMATISM
Fig. 4D
W=10.9°
-5.0 (%) 5.0
DISTORTION

FNO=3.8

-1.0   1.0
SPHERICAL
ABERRATION

CHROMATIC
ABERRATION

—— d line
------ g line
— — C line

Y=21.64

-0.05   0.05
LATERAL
CHROMATIC
ABERRATION

Y=21.64

—— S
- - M

-1.0   1.0
ASTIGMATISM

Y=21.64

-5.0 (%) 5.0
DISTORTION

FNO=6.0

—— d line
------ g line
— — C line

-1.0   1.0
SPHERICAL
ABERRATION

CHROMATIC
ABERRATION

Y=21.64

-0.05   0.05
LATERAL
CHROMATIC
ABERRATION

Y=21.64

—— S
- - M

-1.0   1.0
ASTIGMATISM

Y=21.64

-5.0 (%) 5.0
DISTORTION

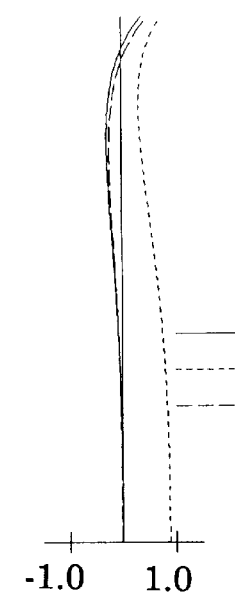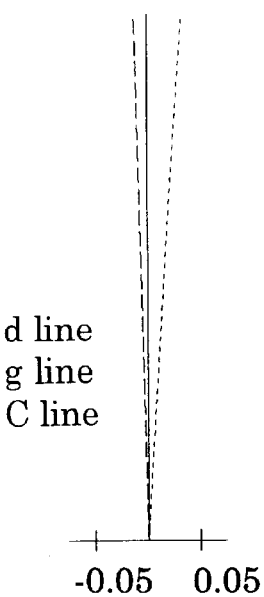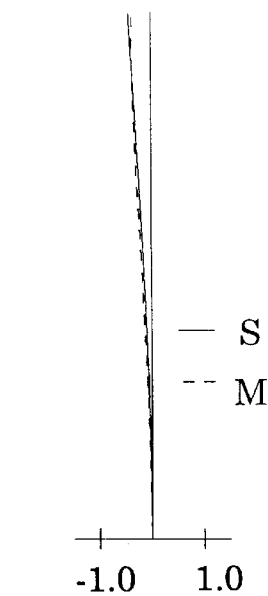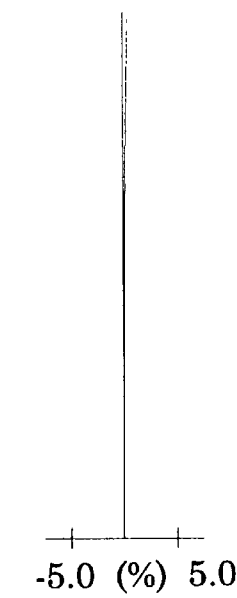
Fig. 7A FNO=10.9 — SPHERICAL ABERRATION CHROMATIC ABERRATION (d line, g line, C line)
Fig. 7B Y=21.64 — LATERAL CHROMATIC ABERRATION
Fig. 7C Y=21.64 — ASTIGMATISM (S, M)
Fig. 7D Y=21.64 — DISTORTION

FNO=3.8

—— d line
······· g line
---- C line

-1.0   1.0
SPHERICAL
ABERRATION

CHROMATIC
ABERRATION

W=28.3°

-0.05   0.05
LATERAL
CHROMATIC
ABERRATION

W=28.3°

—— S
--- M

-1.0   1.0
ASTIGMATISM

W=28.3°

-5.0 (%) 5.0
DISTORTION

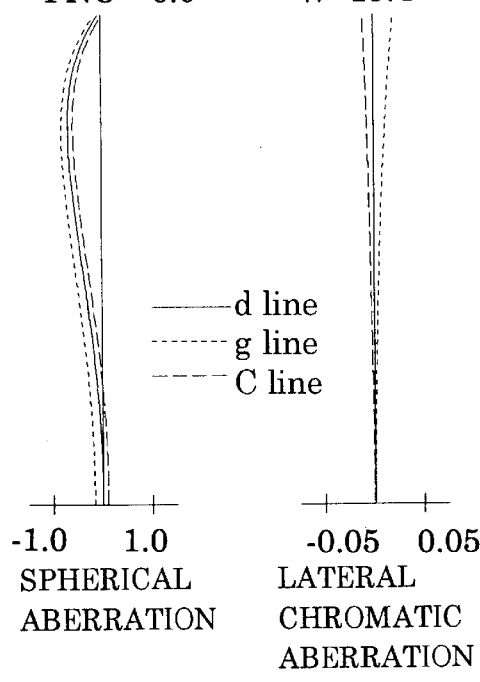
Fig. 10A
FNO=6.0
—— d line
······ g line
--- C line
-1.0  1.0
SPHERICAL
ABERRATION
CHROMATIC
ABERRATION
Fig. 10B
W=19.4°
-0.05  0.05
LATERAL
CHROMATIC
ABERRATION
Fig. 10C
W=19.4°
—— S
--- M
-1.0  1.0
ASTIGMATISM
Fig. 10D
W=19.4°
-5.0 (%) 5.0
DISTORTION
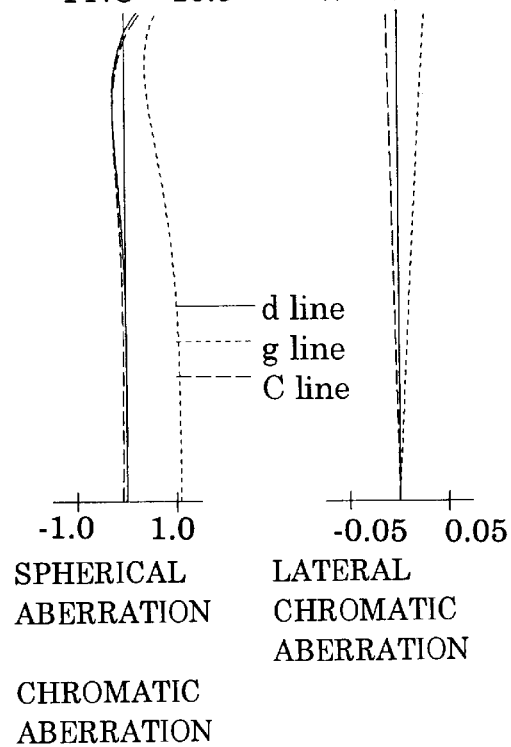
Fig. 11A
FNO=10.9
—— d line
······ g line
--- C line
-1.0  1.0
SPHERICAL
ABERRATION
CHROMATIC
ABERRATION
Fig. 11B
W=10.6°
-0.05  0.05
LATERAL
CHROMATIC
ABERRATION
Fig. 11C
W=10.6°
—— S
--- M
-1.0  1.0
ASTIGMATISM
Fig. 11D
W=10.6°
-5.0 (%) 5.0
DISTORTION

Fig. 12A
FNO=3.8
Fig. 12B
Y=21.64
Fig. 12C
Y=21.64
Fig. 12D
Y=21.64
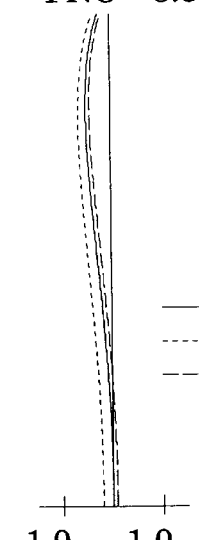
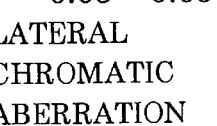
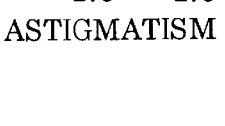
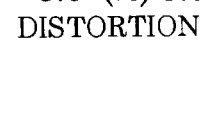
——— d line
------- g line
– – – C line
— S
– – M
-1.0   1.0
SPHERICAL
ABERRATION
CHROMATIC
ABERRATION
-0.05   0.05
LATERAL
CHROMATIC
ABERRATION
-1.0   1.0
ASTIGMATISM
-5.0 (%) 5.0
DISTORTION
Fig. 13A
FNO=6.0
Fig. 13B
Y=21.64
Fig. 13C
Y=21.64
Fig. 13D
Y=21.64
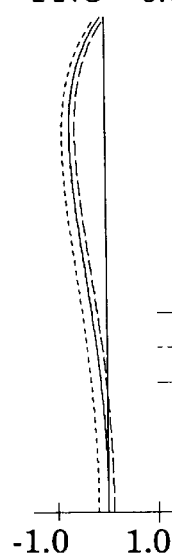
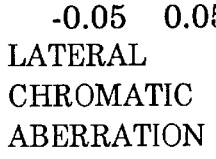
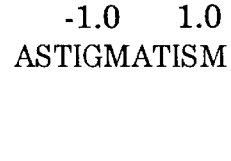
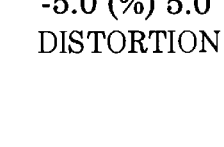
——— d line
------- g line
– – – C line
— S
– – M
-1.0   1.0
SPHERICAL
ABERRATION
CHROMATIC
ABERRATION
-0.05   0.05
LATERAL
CHROMATIC
ABERRATION
-1.0   1.0
ASTIGMATISM
-5.0 (%) 5.0
DISTORTION

FNO=10.9  Y=21.64  Y=21.64  Y=21.64

— d line
---- g line
--- C line

— S
-- M

-1.0  1.0
SPHERICAL
ABERRATION
CHROMATIC
ABERRATION

-0.05  0.05
LATERAL
CHROMATIC
ABERRATION

-1.0  1.0
ASTIGMATISM

-5.0 (%) 5.0
DISTORTION

Fig. 16A
FNO=3.8
Fig. 16B
W=28.3°
Fig. 16C
W=28.3°
Fig. 16D
W=28.3°
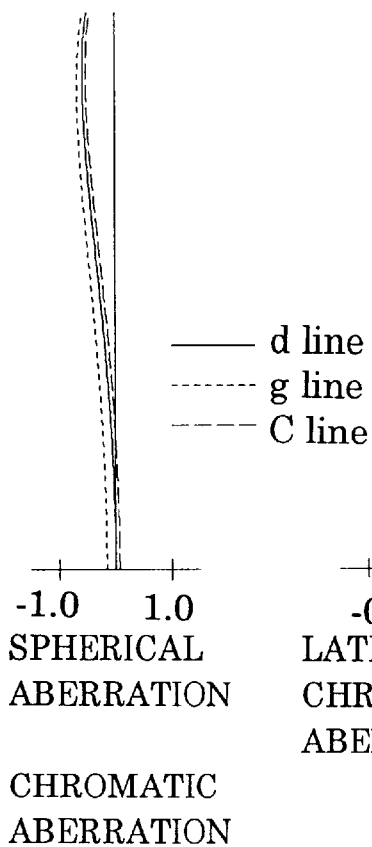
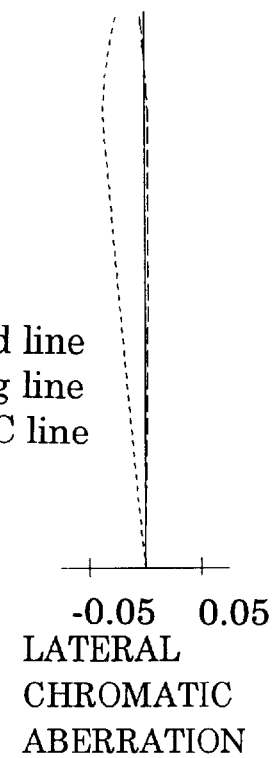
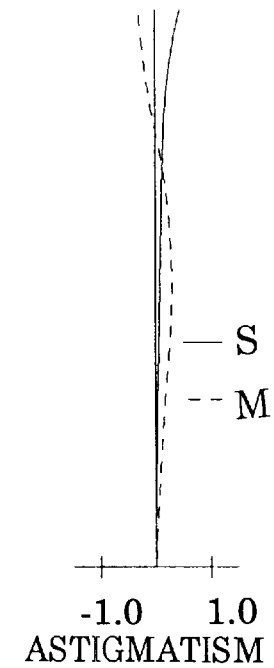
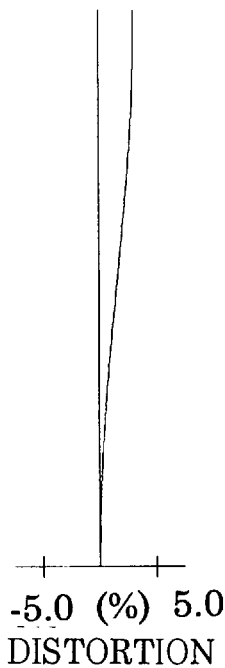
—— d line
------- g line
---- C line
— S
-- M
-1.0  1.0
SPHERICAL
ABERRATION
CHROMATIC
ABERRATION
-0.05  0.05
LATERAL
CHROMATIC
ABERRATION
-1.0  1.0
ASTIGMATISM
-5.0 (%) 5.0
DISTORTION

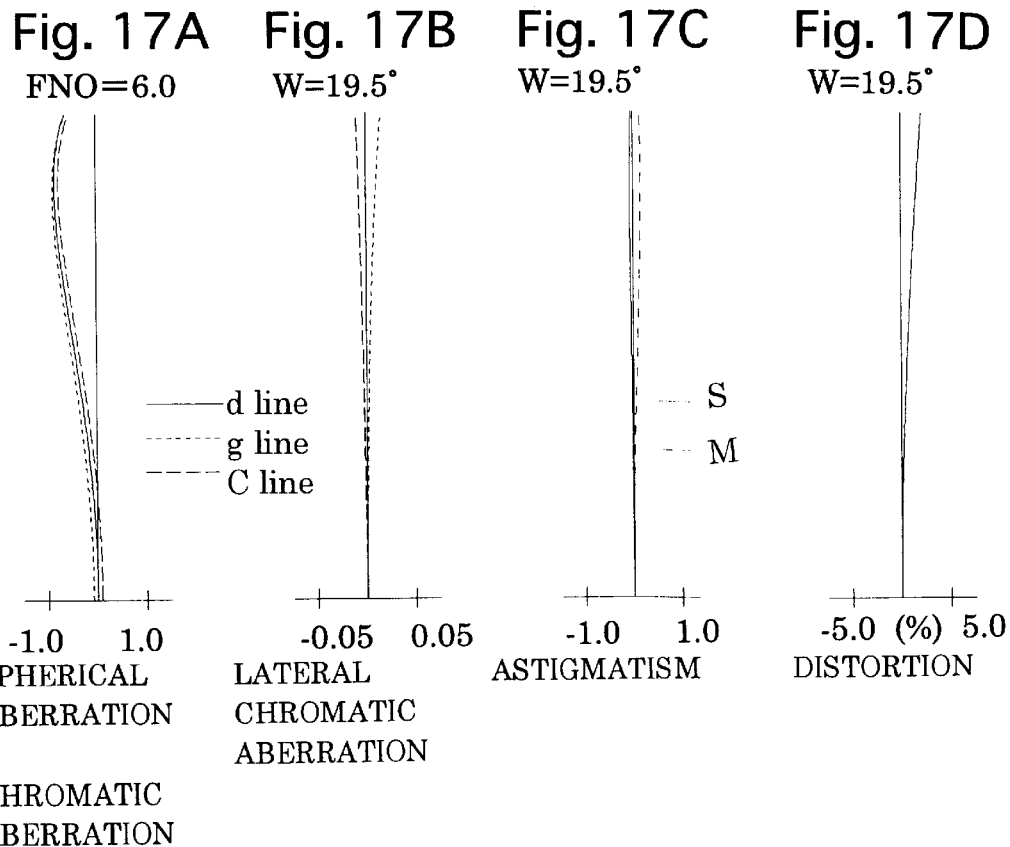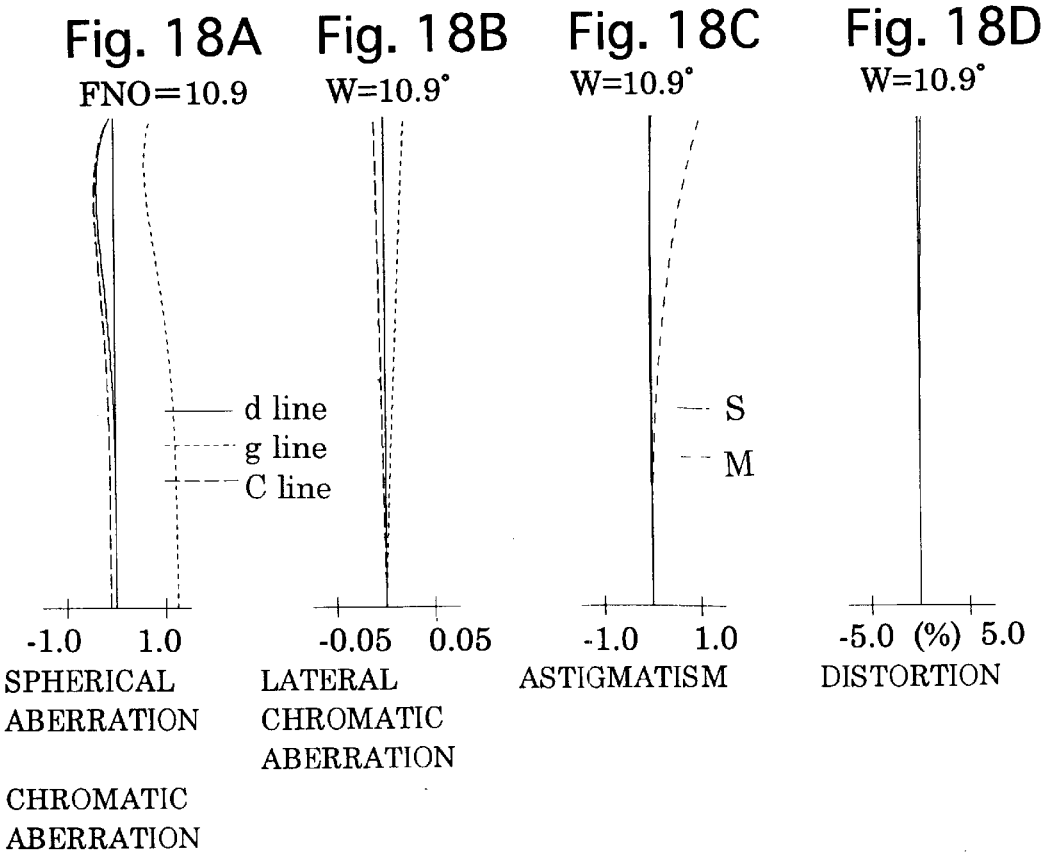

Fig. 19A
FNO=3.8
Fig. 19B
Y=21.64
Fig. 19C
Y=21.64
Fig. 19D
Y=21.64
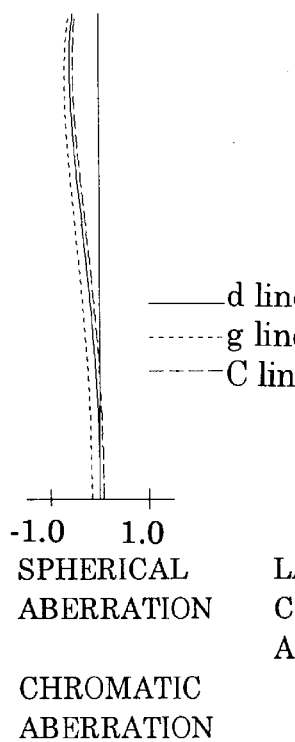
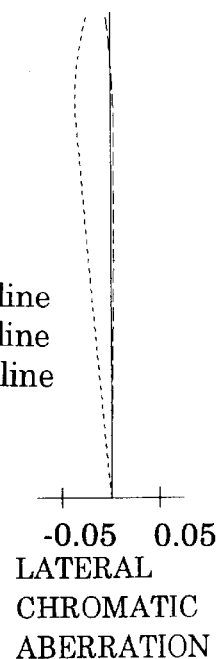
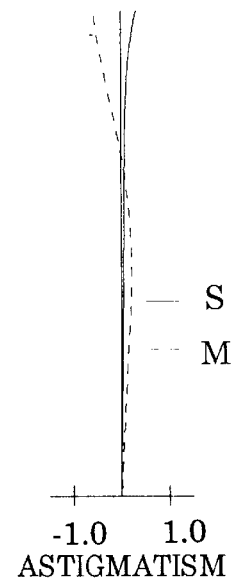
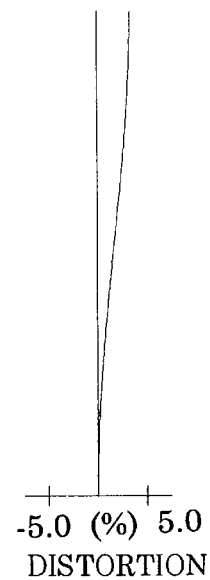
——— d line
------- g line
----- C line
— S
-- M
-1.0   1.0
SPHERICAL
ABERRATION
CHROMATIC
ABERRATION
-0.05   0.05
LATERAL
CHROMATIC
ABERRATION
-1.0   1.0
ASTIGMATISM
-5.0 (%) 5.0
DISTORTION
Fig. 20A
FNO=6.0
Fig. 20B
Y=21.64
Fig. 20C
Y=21.64
Fig. 20D
Y=21.64
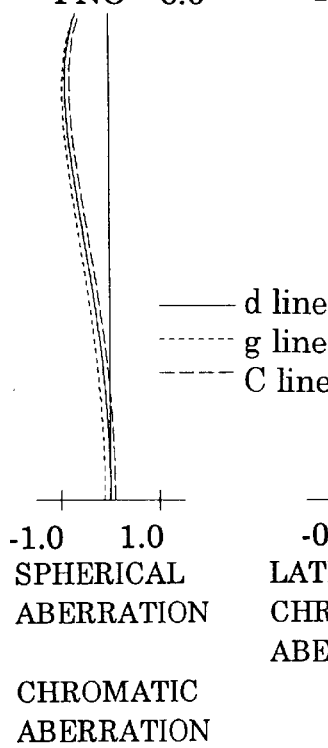
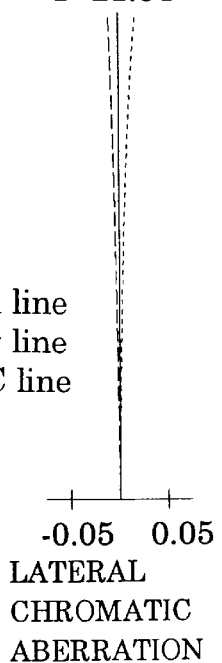
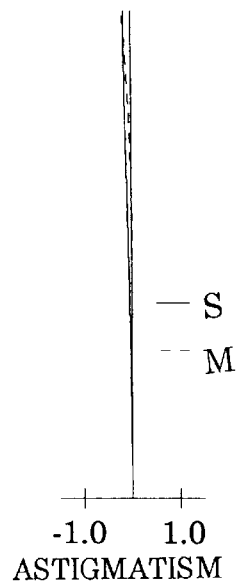
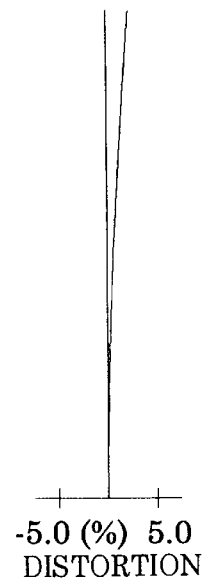
——— d line
------- g line
----- C line
— S
-- M
-1.0   1.0
SPHERICAL
ABERRATION
CHROMATIC
ABERRATION
-0.05   0.05
LATERAL
CHROMATIC
ABERRATION
-1.0   1.0
ASTIGMATISM
-5.0 (%) 5.0
DISTORTION

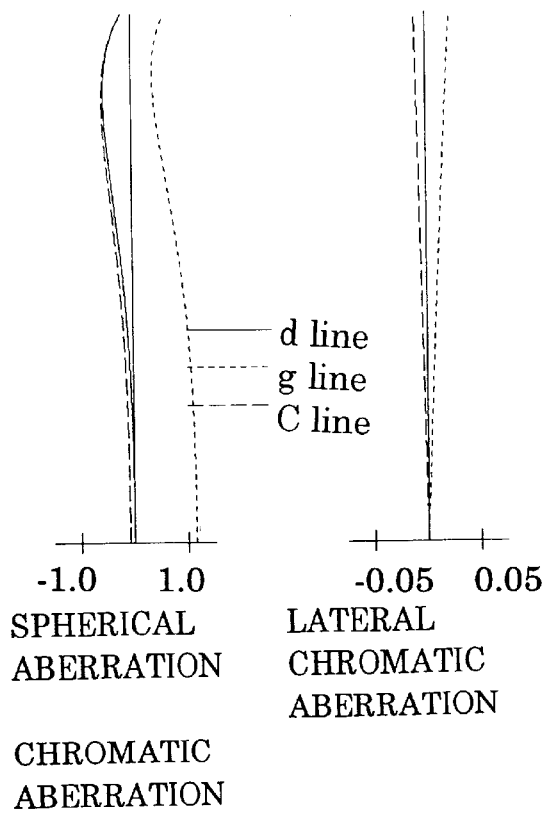
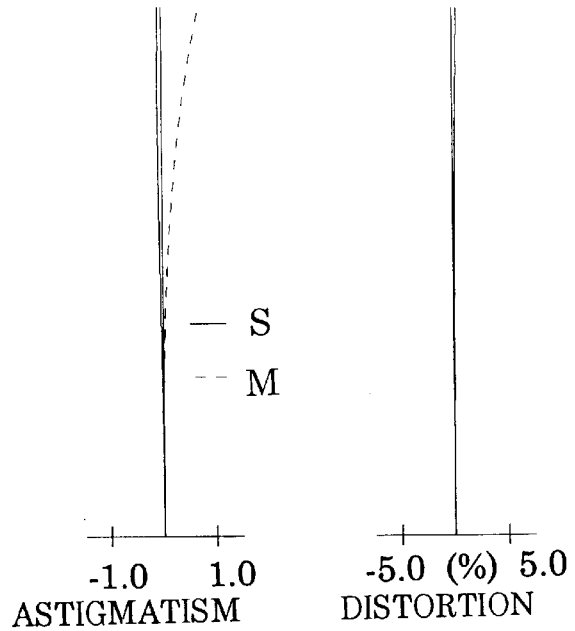
Fig. 21A FNO=10.9 SPHERICAL ABERRATION CHROMATIC ABERRATION
Fig. 21B Y=21.64 LATERAL CHROMATIC ABERRATION
Fig. 21C Y=21.64 ASTIGMATISM
Fig. 21D Y=21.64 DISTORTION

ZOOM LENS SYSTEM AND A FOCUSING METHOD THEREOF

BACKGROUND OF THE INVENTION

1. Field of the Invention

The present invention relates to a zoom lens system for a compact camera, and to a focusing method thereof.

2. Description of the Related Art

As a zoom lens system for a camera, the following zoom lens systems are well-known in the art:

(i) a retrofocus type zoom lens system which includes a negative front lens group and a positive rear lens group in this order from the object, and in which zooming is performed by varying the distance therebetween; and (ii) a telephoto type zoom lens system which includes a positive front lens group and a negative rear lens group in this order from the object, and in which zooming is performed by varying the distance therebetween.

The retrofocus type zoom lens system is mainly used in a single lens reflex (SLR) camera which requires a space for a mirror behind the photographing optical system.

The telephoto type zoom lens system is mainly used in a compact camera which does not require a long back focal distance.

Due to the two-lens-group arrangement of the above types, the number of lens elements is small, a structure of the zoom lens system can be simplified, and miniaturization thereof can be attained. However, if a zoom ratio becomes about 3 or more, it is difficult to correct field curvature occurred at any focal length along a zooming range defined by the short focal length extremity and the long focal length extremity.

In recent years, in addition to the requirement of miniaturization, a zoom lens system for a compact camera is required to have a high zoom ratio. In order to satisfy this requirement, in a compact camera with a telephoto type zoom lens system, a three-lens-group arrangement is frequently employed. In this zoom lens system, each of the three lens groups is independently moved along the optical axis upon zooming; and on the other hand, one of the first and second lens groups is moved along the optical axis upon focusing.

In order to attain miniaturization of a zoom lens system, it is important to reduce (i) the overall length of the lens system, (ii) the diameter thereof, and (iii) the thickness of each lens group. However, if lens elements are eliminated to reduce the thickness of a lens group, the number of lens elements constituting a focusing lens group is reduced accordingly. As a result, it becomes difficult to suitably correct aberrations from an infinite photographing distance to the closest photographing distance over the zooming range defined by the short focal length extremity and the long focal length extremity. This tendency becomes more noticeable when a zoom ratio is set higher. In order to correct aberrations suitably from infinity to the closest photographing distance, the number of lens elements in the focusing lens group has to be increased. Consequently, it is not practically possible to attain both miniaturization of a lens system and a high zoom ratio thereof.

SUMMARY OF THE INVENTION

It is an object of the present invention to provide a telephoto-type three-lens-group zoom lens system, with a small number of lens elements, which can suitably correct aberrations.

In the present invention, there is provided a zoom lens system which includes a positive first lens group, a positive second lens group, and a negative third lens group, in this order from the object, and in which each of the three lens groups is independently moved, along the optical axis, upon zooming so that the distances therebetween become shorter; and the zoom lens system satisfies the following condition:

$$0.03 < (d_{12W} - d_{12T})/f_W < 0.15 \tag{1}$$

wherein $d_{12W}$ designates the distance between the most image-side surface of the first lens group and the most object-side surface of the second lens group, at the short focal length extremity;

$d_{12T}$ designates the distance between the most image-side surface of the first lens group and the most object-side surface of the second lens group, at the long focal length extremity; and '$f_W$ designates the focal length of the entire zoom lens system at the short focal length extremity.

The first and second lens groups, which are independently moved upon zooming, are preferably moved together upon focusing. According to this arrangement, the number of lens elements constituting a focusing lens group can substantially be increased, and thereby the correcting of aberrations over the entire photographing range (i.e., from an infinite photographing distance to the closest photographing distance) can be made easily, and further no cost increase is incurred.

The zoom lens system preferably satisfies the following condition:

$$10 < K_F < 20 \tag{2}$$

wherein $K_F = (f_T/f_{FT})^2$ $f_T$ designates the focal length of the entire zoom lens system at the long focal length extremity; and $f_{FT}$ designates the resultant focal length, at the long focal length extremity, of the first lens group and the second lens group.

Further, the first lens group preferably includes three lens elements, and the second lens group preferably includes two lens elements, and thereby, with a small number of the lens elements, aberrations can suitably be corrected over the entire photographing range.

Still further, according to the present invention, there is provided a focusing method for a zoom lens system including a positive first lens group, a positive second lens group, and a negative third lens group, in this order from the object, wherein the method including the steps of:

(i) independently moving the first, second and third lens groups, along the optical axis, upon zooming so that he distances therebetween become shorter; and (ii) integrally moving the first lens group and the second lens group along the optical axis upon focusing.

The present disclosure relates to subject matter contained in Japanese Patent Application No. Hei-11-144819 filed on May 25, 1999) which is expressly incorporated herein by reference in its entirety.

BRIEF DESCRIPTION OF THE DRAWINGS

The invention will be discussed below in detail with reference to the accompanying drawings, in which:

FIGS. 3A, 3B, 3C and 3D show aberration diagrams of the lens arrangement of FIG. 1 at an intermediate focal length, and the zoom lens system is focused at an infinite object distance;

FIGS. 4A, 4B, 4C and 4D show aberration diagrams of the lens arrangement of FIG. 1 at the long focal length extremity, and the zoom lens system is focused at an infinite object distance;

FIGS. 7A, 7B, 7C and 7D show aberration diagrams of the lens arrangement of FIG. 1 at the long focal length extremity, and the zoom lens system is focused at a finite object distance;

FIGS. 10A, 10B, 10C and 10D show aberration diagrams of the lens arrangement of FIG. 8 at an intermediate focal length, and the zoom lens system is focused at an infinite object distance;

FIGS. 11A, 11B, 11C and 11D show aberration diagrams of the lens arrangement of FIG. 8 at the long focal length extremity, and the zoom lens system is focused at an infinite object distance;

FIGS. 12A, 12B, 12C and 12D show aberration diagrams of the lens arrangement of FIG. 8 at the short focal length extremity, and the zoom lens system is focused at a finite object distance;

FIGS. 13A, 13B, 13C and 13D show aberration diagrams of the lens arrangement of FIG. 8 at an intermediate focal length, and the zoom lens system is focused at a finite object distance;

FIGS. 16A, 16B, 16C and 16D show aberration diagrams of the lens arrangement of FIG. 15 at the short focal length extremity, and the zoom lens system is focused at an infinite object distance;

FIGS. 17A, 17B, 17C and 17D show aberration diagrams of the lens arrangement of FIG. 15 at an intermediate focal length, and the zoom lens system is focused at an infinite object distance;

FIGS. 18A, 18B, 18C and 18D show aberration diagrams of the lens arrangement of FIG. 15 at the long focal length extremity, and the zoom lens system is focused at an infinite object distance;

FIGS. 19A, 19B, 19C and 19D show aberration diagrams of the lens arrangement of FIG. 15 at the short focal length extremity, and the zoom lens system is focused at a finite object distance;

FIGS. 20A, 20B, 20C and 20D show aberration diagrams of the lens arrangement of FIG. 15 at an intermediate focal length, and the zoom lens system is focused at a finite object distance;

FIGS. 21A, 21B, 21C and 21D show aberration diagrams of the lens arrangement of FIG. 15 at the long focal length extremity, and the zoom lens system is focused at a finite object distance;

DESCRIPTION OF THE PREFERRED EMBODIMENTS

Figure 22:
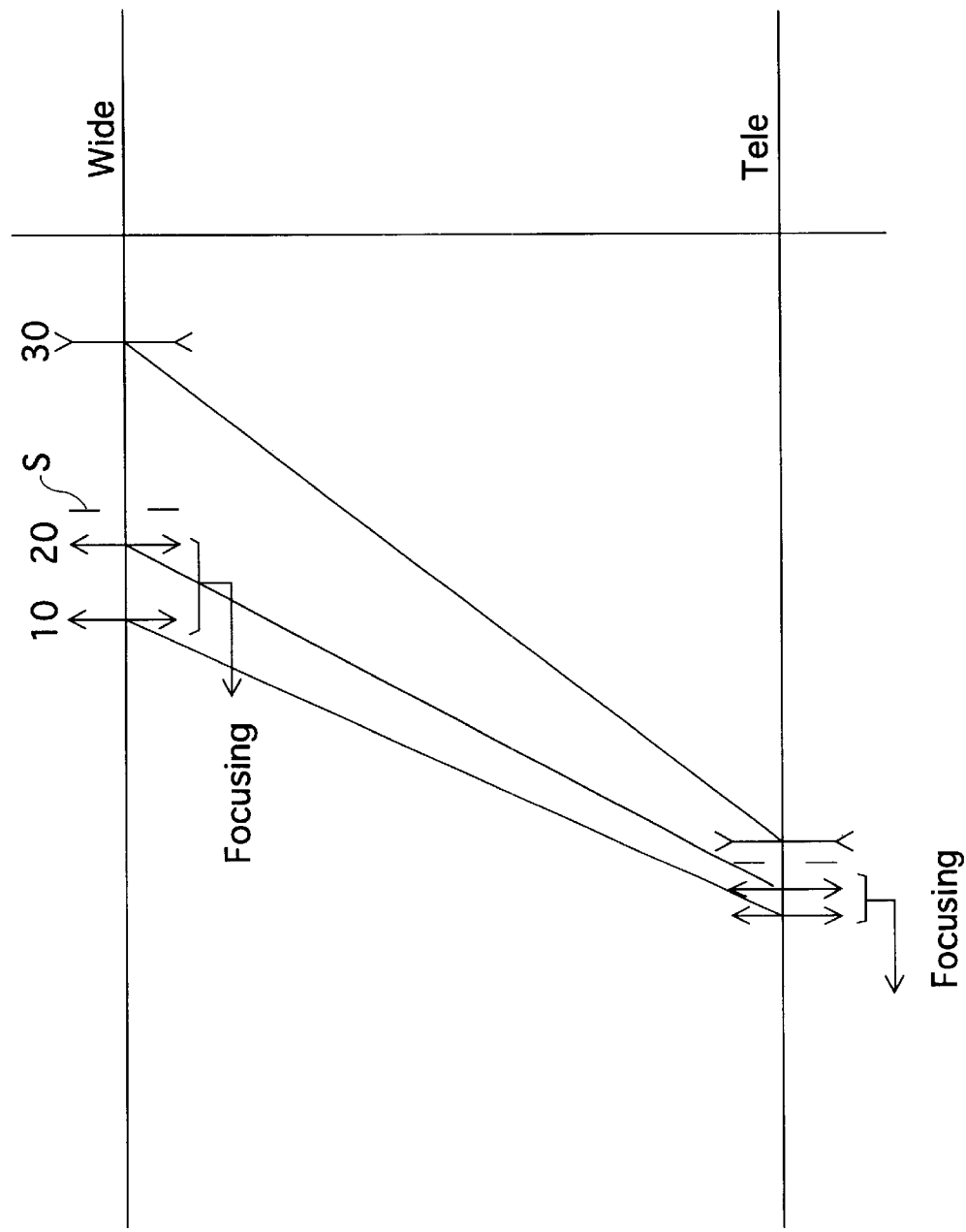
FIG. 22 is the lens-group moving paths of a zoom lens system according to the present invention.

The zoom lens system according to the present invention includes a positive first lens group 10, a positive second lens group 20, and a negative third lens group 30, in this order from the object, as shown in the lens-group moving paths of FIG. 22. In this three-lens-group zoom lens system, upon zooming from the short focal length extremity toward the long focal length extremity, the first, second and third lens groups independently move toward the object while the distances therebetween are varied. More concretely, in the above-described zooming direction, the distances between the first and second lens groups, and that of the second and third lens groups become shorter. The diaphragm S is provided between the second lens group 20 and the third lens group 30, and moves integrally with the second lens group 20 upon zooming. On the other hand, the diaphragm S does not move upon focusing in which the first and second lens groups are integrally moved.

Since the first lens group 10 and the second lens group 20 move independently upon zooming, the distance therebetween varies at different focal length points. When focusing is performed, the first lens group 10 and the second lens group 20 are integrally moved while the distance therebetween at a given focal length point is maintained. By integrally moving the first and second lens groups which are arranged to move independently upon zooming, even if the number of lens elements for each lens group is small, the number of lens elements constituting the focusing lens group is increased. Therefore the correcting of aberrations over the entire photographing range becomes easier, compared with the case where only the first or the second lens group is used for focusing. Consequently, opposing requirements, i.e., the correcting of aberrations upon focusing under a higher zoom ratio, and a smaller number of lens elements due to miniaturization of a lens system, can be satisfied.

Condition (1) specifies the distance between the first lens group 10 and the second lens group 20 at the long and short focal length extremities. By satisfying this condition, variations of the distance between the first and second lens groups can be reduced, and the length and the diameter of the lens groups can be reduced. Compared with a conventional three-lens-group zoom lens system, a miniaturized three-lens-group zoom lens system with a smaller front-lens diameter, which is equivalent to that of a two-lens-group lens system, can be obtained. Since the front-lens diameter is reduced, a dimension of a camera body in the up-and-down direction can particularly be reduced, and thereby a much more miniaturized compact camera can be obtained.

If $(d_{12W} - d_{12T})/f_W$ exceeds the upper limit of condition (1), the overall length of the focusing lens group increases at the short focal length extremity, and thereby the lens diameter and the overall length of the lens system increases.

If $(d_{12W}-d_{12T})/f_W$ exceeds the lower limit of condition (1), the correcting of field curvature over the entire zooming range becomes insufficient.

Condition (2) specifies the sensitivity of the focusing lens group (i.e., the first lens group 10 and the second lens group 20). By satisfying this condition, the traveling distance of the focusing lens group upon focusing is reduced, and miniaturization of the zoom lens system can be achieved.

If $K_F$ exceeds the upper limit of condition (2), the sensitivity of the focusing lens group becomes too high, and it becomes difficult to perform a precise focusing operation.

If $K_F$ exceeds the lower limit of condition (2), the traveling distance of the focusing lens group becomes too long.

Specific numerical examples will herein be discussed. In the diagrams of chromatic aberration (axial chromatic aberration) represented by spherical aberration, the solid line and the two types of dotted lines respectively indicate spherical aberration with respect to the d, g and C lines. Also, in the diagrams of lateral chromatic aberration, the solid line and the two types of dotted lines respectively indicate magnification with respect to the d, g and C lines. S designates the sagittal image, and M designates the meridional image. In the tables, $F_{NO}$ designates the F-number, f designates the focal length of the entire lens system, W designates the half angle-of-view (°), Y designates the image height, $f_B$ designates the back focal distance, R designates the radius of curvature, d designates the lens thickness or space between. lens surfaces, $N_d$ designates the refractive index of the d line, and ν designates the Abbe number.

In addition to the above, an aspherical surface which is symmetrical with respect to the optical axis is defined as follows:

$$x=Ch^2/\{1+[1-(1+K)\,C^2h^2]^{1/2}\}+A4h^4+A6h^6+A8h^8+A10h^{10}$$

wherein:
x designates a distance from a tangent plane of an aspherical vertex;
C designates a curvature of the aspherical vertex (1/R);
h designates a distance from the optical axis;
K designates the conic coefficient;
A4 designates a fourth-order aspherical coefficient;
A6 designates a sixth-order aspherical coefficient;
A8 designates a eighth-order aspherical coefficient; and
A10 designates a tenth-order aspherical coefficient;

Embodiment 1

Figure 1:
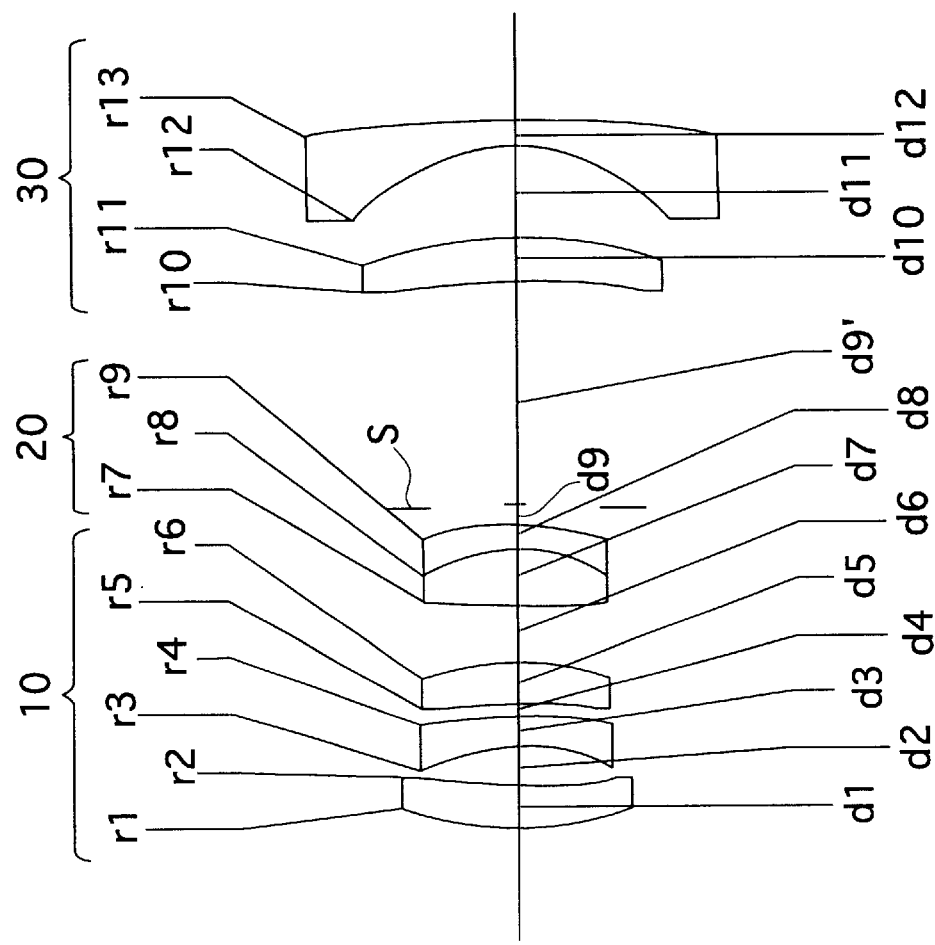
FIG. 1 is a lens arrangement of a first embodiment of a zoom lens system according to the present invention.
Figure 2A:
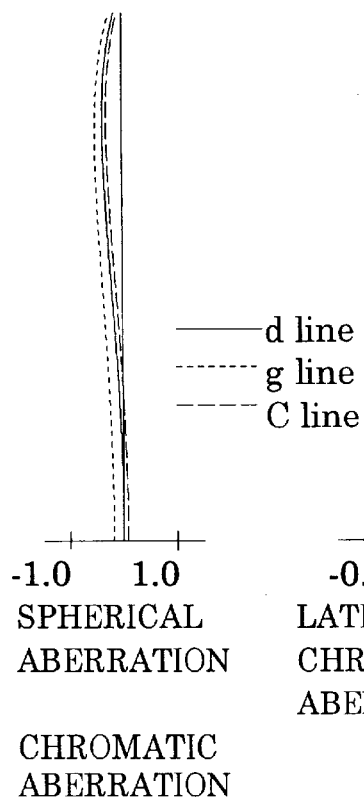
FIGS. 2A, 2B, 2C and 2D show aberration diagrams of the lens arrangement of FIG. 1 at the short focal length extremity, and the zoom lens system is focused at an infinite object distance.
Figure 2B:
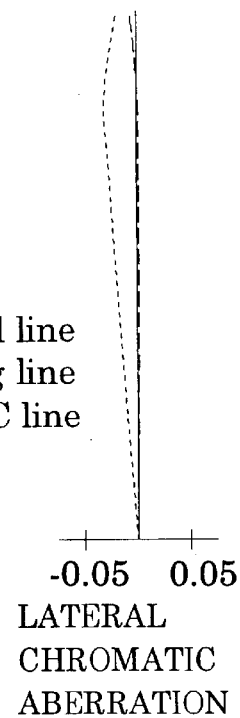
Figure 2C:
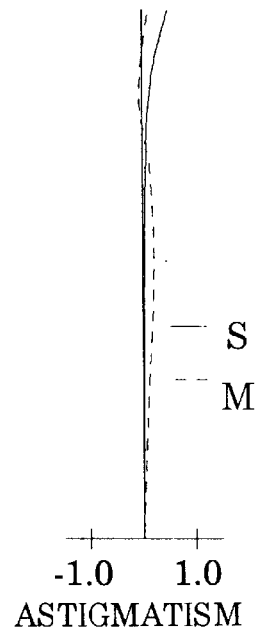
Figure 2D:
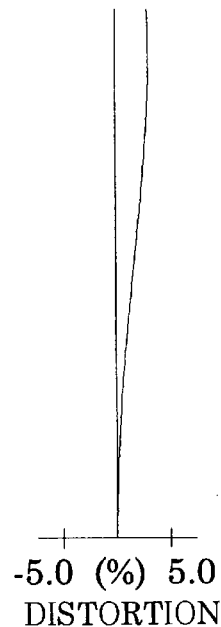
Figure 5A:
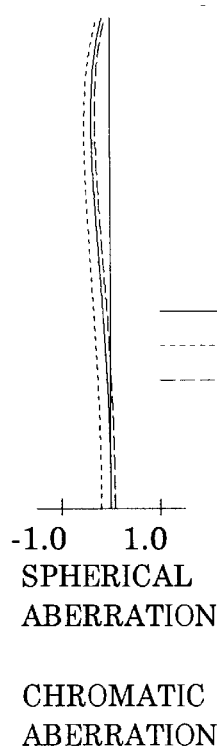
FIGS. 5A, 5B, 5C and 5D show aberration diagrams of the lens arrangement of FIG. 1 at the short focal length extremity, and the zoom lens system is focused at a finite object distance.
Figure 5B:
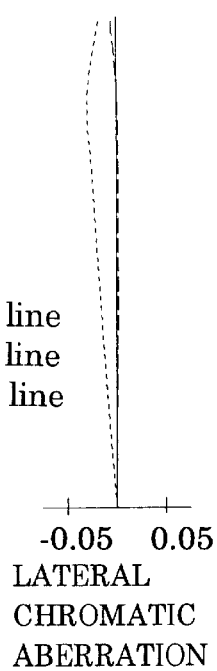
Figure 5C:
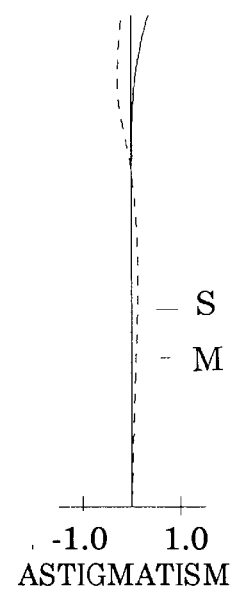
Figure 5D:
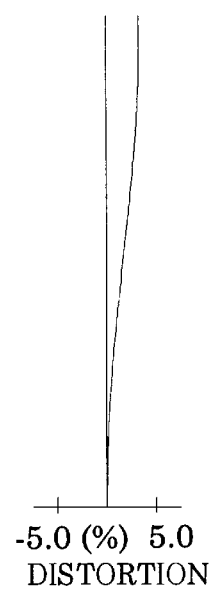
Figure 6A:
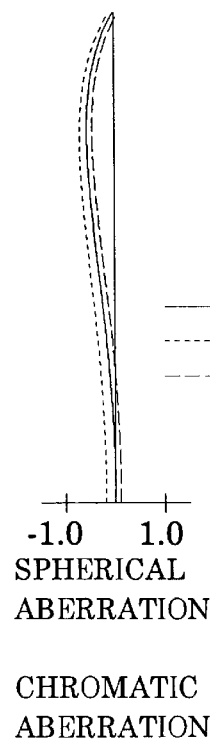
FIGS. 6A, 6B, 6C and 6D show aberration diagrams of the lens arrangement of FIG. 1 at an intermediate focal length, and the zoom lens system is focused at a finite object distance.
Figure 6B:
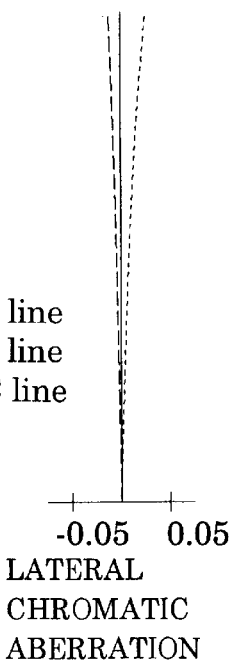
Figure 6C:
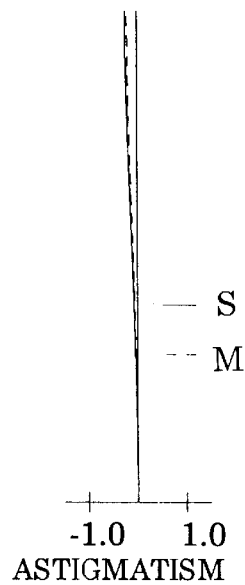
Figure 6D:
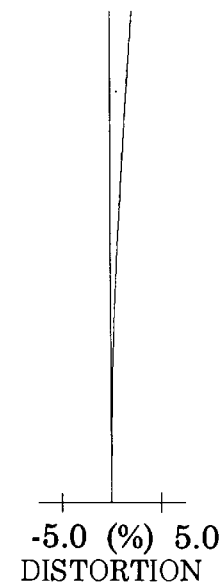

FIGS. 1 through 7 show the first embodiment of the zoom lens system according to the present invention. FIG. 1 is a lens arrangement of the first embodiment. The first lens group 10 includes a positive lens element, a negative lens element, and a positive lens element, in this order from the object. The second lens group 20 includes a cemented sub lens group having a positive lens element and a negative lens element, in this order from the object. The third lens group 30 includes a positive lens element and a negative lens element, in this order from the object. FIGS. 2A through 2D, FIGS. 3A through 3D, and FIGS. 4A through 4D show aberration diagrams of the lens arrangement of FIG. 1, respectively at the short focal length extremity, at an intermediate focal length, and at the long focal length extremity, when the zoom lens system is focused at an infinite object distance. Further, FIGS. 5A through 5D, FIGS. 6A through 6D, and FIGS. 7A through 7D show aberration diagrams of the lens arrangement of FIG. 1, respectively at the short focal length extremity, at an intermediate focal length, and at the long focal length extremity, when the zoom lens system is focused at a finite object distance (an object-image distance: u=2.45 m). Table 1 shows the numerical data thereof upon focusing, the first lens group 10 and the second lens group 20 move with respect to the diaphragm S which is made immoveable during focusing. In Table 1, the values of d9 designate the distance between the diaphragm S and the most image-side surface of the second lens group 20. The values of d corresponding to the diaphragm in Table 1 designate the distance (indicated as d9' in FIG. 1) between the diaphragm and the most object-side surface of the third lens group 30. The same can be applied to the second and third embodiments.

TABLE 1

$F_{NO} = 1:3.8–6.0–10.9$
f = 39.00–60.00–112.00 (Zoom Ratio: 2.87)
W = 28.3–19.5–10.9
$f_B$ = 9.42–27.76–73.25

| Surface No. | R | d | Nd | ν |
|---|---|---|---|---|
| 1 | 19.194 | 2.27 | 1.51165 | 54.4 |
| 2 | 30.389 | 2.02 | — | — |
| 3 | −12.683 | 1.80 | 1.83400 | 37.2 |
| 4 | −28.603 | 0.60 | — | — |
| 5 | −63.179 | 2.40 | 1.48700 | 67.6 |
| 6 | −13.434 | 3.00–2.00–1.00 | — | — |
| 7 | 55.649 | 3.16 | 1.51823 | 59.0 |
| 8 | −9.617 | 1.40 | 1.80400 | 46.6 |
| 9 | −16.664 | 1.00–1.00–1.00 1.32–1.32–1.32 | (infinite object distance) (finite object distance) | |
| Diaphragm | ∞ | 12.55–6.71–1.73 | — | — |
| 10* | −35.435 | 2.53 | 1.58547 | 29.9 |
| 11 | −22.246 | 4.99 | — | — |
| 12 | −11.363 | 1.50 | 1.71300 | 53.9 |
| 13 | −87.874 | — | — | — |

*designates the aspherical surface which is rotationally symmetrical with respect to the optical axis.

Aspherical surface data (the aspherical surface coefficients not indicated are zero (0.00)):

Surface K A4 A6 A8 10 0.00 0.3422×10$^{-4}$ 0.3899×10$^{-6}$ 0.7946×10$^{-9}$

Embodiment 2

Figure 8:
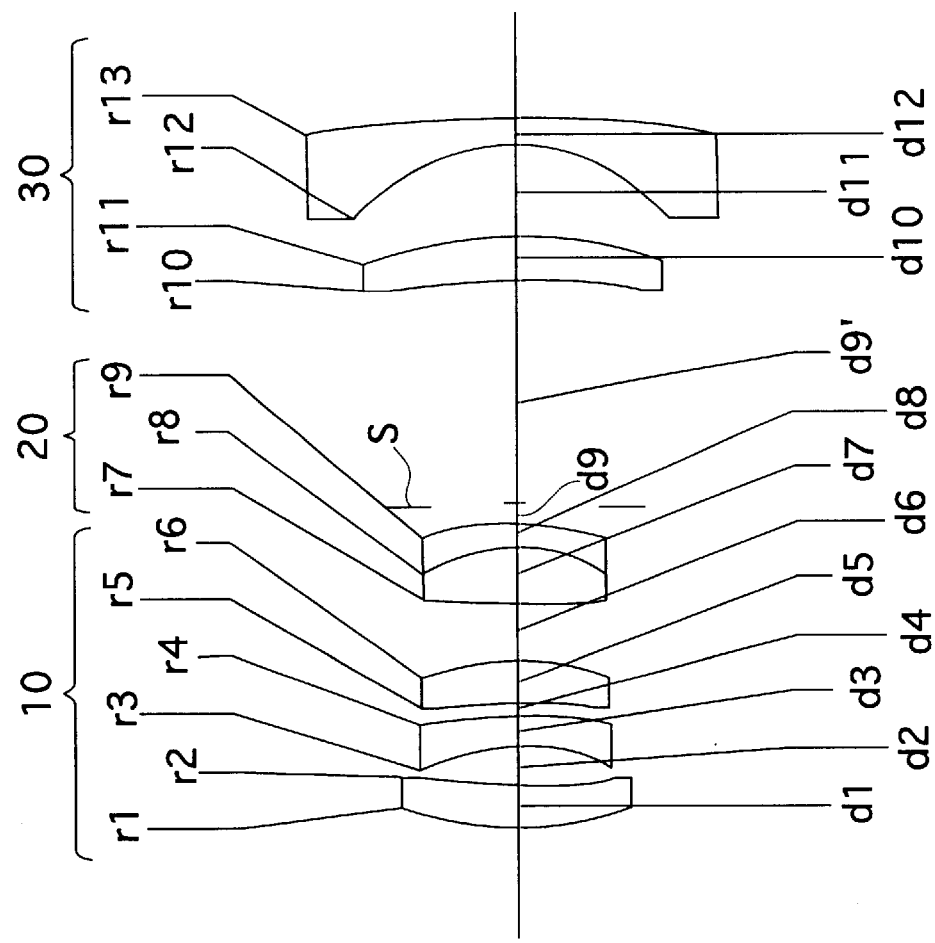
FIG. 8 is a lens arrangement of a second embodiment of a zoom lens system according to the present invention.
Figure 9A:
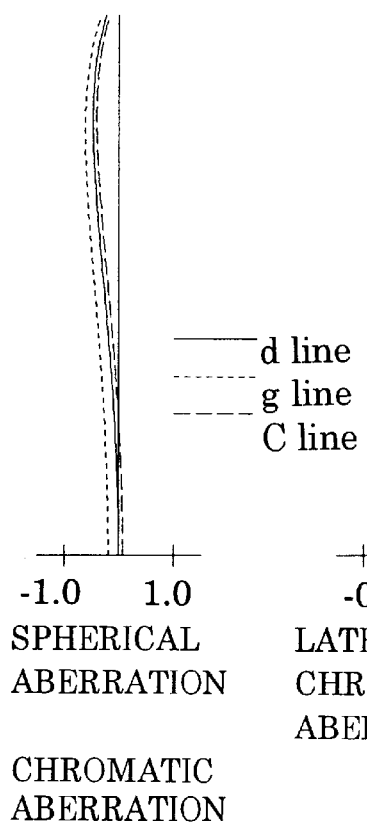
FIGS. 9A, 9B, 9C and 9D show aberration diagrams of the lens arrangement of FIG. 8 at the short focal length extremity, and the zoom lens system is focused at an infinite object distance.
Figure 9B:
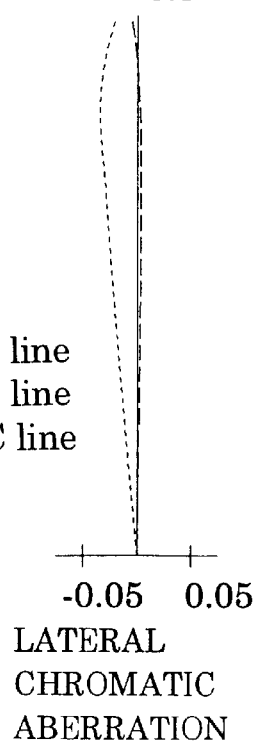
Figure 9C:
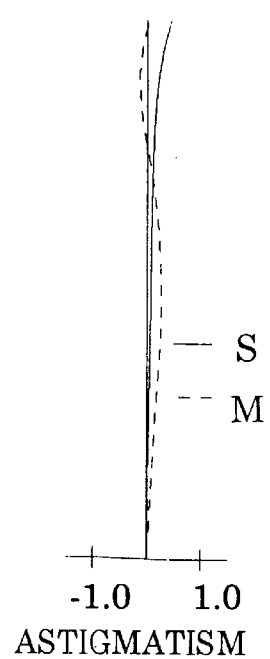
Figure 9D:
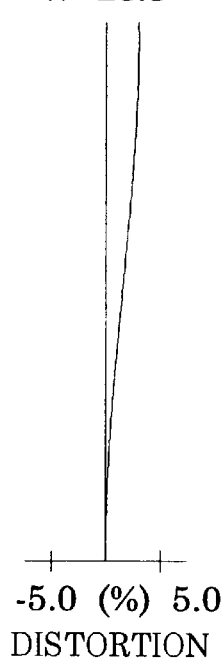
Figure 14A:
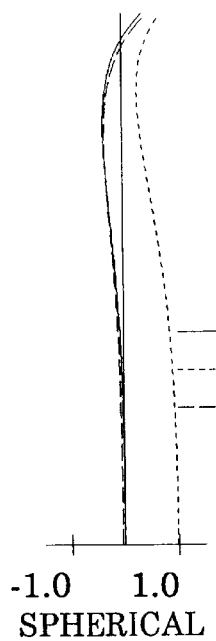
FIGS. 14A, 14B, 14C and 14D show aberration diagrams of the lens arrangement of FIG. 8 at the long focal length extremity, and the zoom lens system is focused at a finite object distance.
Figure 14B:
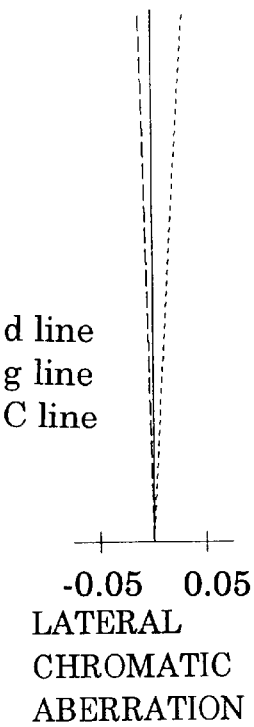
Figure 14C:
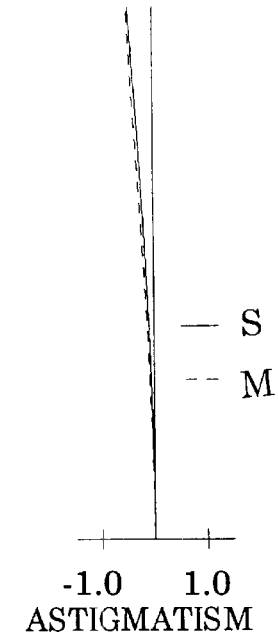
Figure 14D:
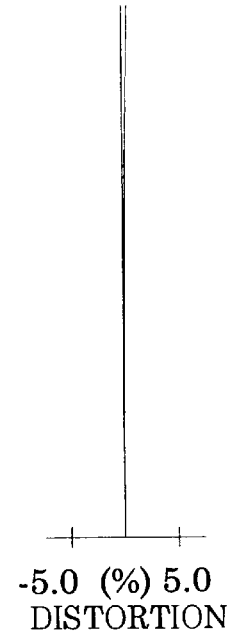

FIGS. 8 through 14 show the second embodiment of the zoom lens system according to the present invention. FIG. 8 is a lens arrangement of the second embodiment. FIGS. 9A through 9D, FIGS. 10A through 10D, and FIGS. 11A through 11D show aberration diagrams of the lens arrangement of FIG. 8, respectively at the short focal length extremity, at an intermediate focal length, and at the long focal length extremity, when the zoom lens system is focused at an infinite object distance. Further, FIGS. 12A through 12D, FIGS. 13A through 13D, and FIGS. 14A through 14D show aberration diagrams of the lens arrangement of FIG. 8, respectively at the short focal length extremity, at an intermediate focal length, and at the long focal length extremity, when the zoom lens system is focused at a finite object distance (an object-image distance: u=2.45 m). Table 2 shows the numerical data thereof. The basic lens arrangement is the same as the first embodiment.

TABLE 2

$F_{NO} = 1:3.8–6.0–10.9$
$f = 39.00–60.00–115.00$ (Zoom Ratio: 2.95)
$W = 28.3–19.4–10.6$
$f_B = 9.41–27.85–76.25$

| Surface No. | R | d | Nd | ν |
|---|---|---|---|---|
| 1 | 15.967 | 2.27 | 1.48882 | 63.5 |
| 2 | 22.268 | 2.07 | — | — |
| 3 | −13.267 | 1.80 | 1.83400 | 37.2 |
| 4 | −28.462 | 0.60 | — | — |
| 5 | −53.498 | 2.40 | 1.48750 | 68.4 |
| 6 | −14.210 | 3.50–2.00–0.50 | — | — |
| 7 | 48.594 | 3.16 | 1.51823 | 59.0 |
| 8 | −9.479 | 1.40 | 1.80400 | 46.6 |
| 9 | −16.309 | 1.00–1.00–1.00 1.31–1.31–1.31 | (infinite object distance) (finite object distance) | |
| Diaphragm | ∞ | 12.51–6.71–1.63 | — | — |
| 10* | −28.480 | 2.53 | 1.58547 | 29.9 |
| 11 | −19.464 | 4.83 | — | — |
| 12 | −11.623 | 1.50 | 1.71300 | 53.9 |
| 13 | −102.342 | — | — | — |

*designates the aspherical surface which is rotationally symmetrical with respect to the optical axis.

Aspherical surface data (the aspherical surface coefficients not indicated are zero (0.00)):

K A4 A6 A8 10 0.00 $0.2522 \times 10^{-4}$ $0.4468 \times 10^{-6}$ $0.1007 \times 10^{-9}$

Embodiment 3

Figure 15:
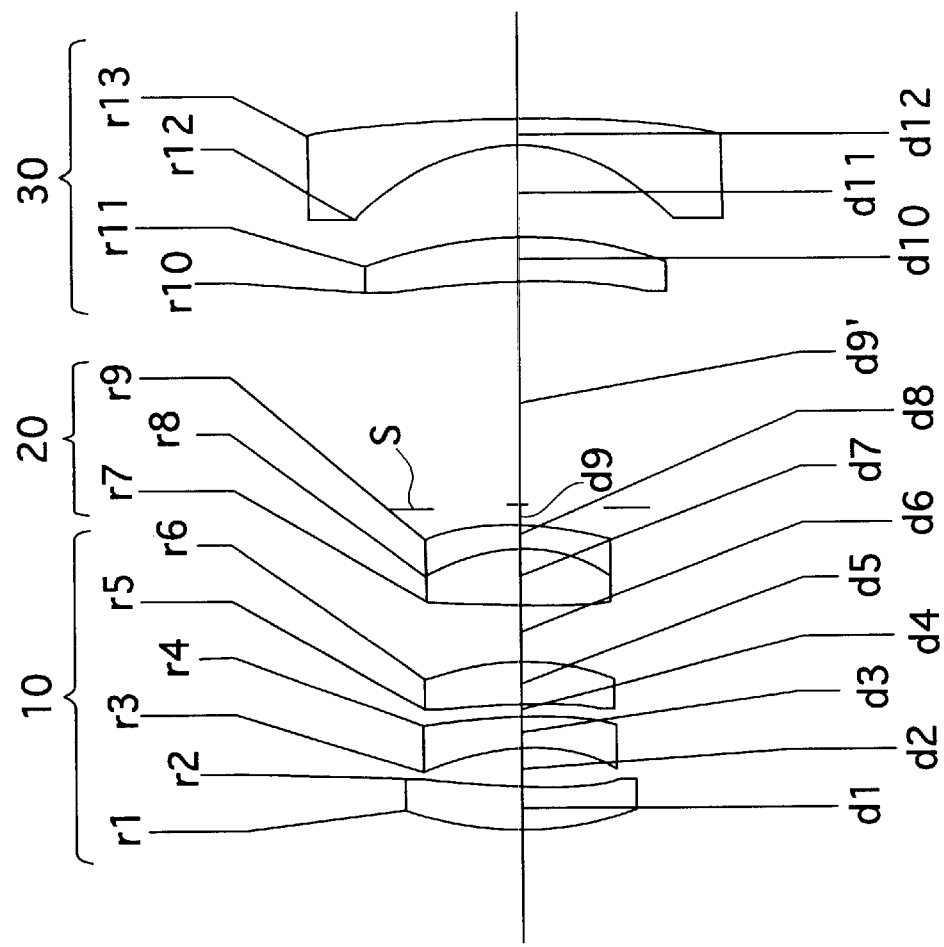
FIG. 15 is a lens arrangement of a third embodiment of a zoom lens system according to the present invention.

FIGS. 15 through 21 show the third embodiment of the zoom lens system according to the present invention. FIG. 15 is a lens arrangement of the third embodiment.

FIGS. 16A through 16D, FIGS. 17A through 17D, and FIGS. 18A through 18D show aberration diagrams of the lens arrangement of FIG. 15, respectively at the short focal length extremity, at an intermediate focal length, and at the long focal length extremity, when the zoom lens system is focused at an infinite object distance. Further, FIGS. 19A through 19D, FIGS. 20A through 20D, and FIGS. 21A through 21D show aberration diagrams of the lens arrangement of FIG. 15, respectively at the short focal length extremity, at an intermediate focal length, and at the long focal length extremity, when the zoom lens system is focused at a finite object distance (an object-image distance: u=2.45 m). Table 3 shows the numerical data thereof. The basic lens arrangement is the same as the first embodiment.

TABLE 3

$F_{NO} = 1:3.8–6.0–10.9$
$f = 39.00–60.00–112.00$ (Zoom Ratio: 2.87)
$W = 28.3–19.5–10.9$
$f_B = 9.45–27.77–72.99$

| Surface No. | R | d | Nd | ν |
|---|---|---|---|---|
| 1 | 16.170 | 2.27 | 1.48000 | 68.2 |
| 2 | 24.388 | 2.00 | — | — |
| 3 | −13.658 | 1.80 | 1.83400 | 37.2 |
| 4 | −30.808 | 0.60 | — | — |
| 5 | −42.028 | 2.40 | 1.48750 | 70.4 |
| 6 | −14.120 | 3.00–2.00–1.50 | — | — |
| 7 | 43.414 | 3.16 | 1.51823 | 59.0 |
| 8 | −9.824 | 1.40 | 1.80400 | 46.6 |
| 9 | −16.762 | 1.00–1.00–1.00 1.32–1.32–1.32 | (infinite object distance) (finite object distance) | |
| Diaphragm | ∞ | 12.58–6.64–1.57 | — | — |
| 10* | −40.090 | 2.53 | 1.58547 | 29.9 |
| 11 | −23.910 | 4.94 | — | — |
| 12 | −11.593 | 1.50 | 1.71300 | 53.9 |
| 13 | −98.679 | — | — | — |

*designates the aspherical surface which is rotationally symmetrical with respect to the optical axis.

Aspherical surface data (the aspherical surface coefficients not indicated are zero (0.00)):

Surface No. K A4 A6 A8 10 0.00 $0.2853 \times 10^{-4}$ $0.4169 \times 10^{-6}$ $0.4076 \times 10^{-10}$ Table 4 shows the numerical values of each condition in each embodiment.

TABLE 4

| | Embodiment 1 | Embodiment 2 | Embodiment 3 |
|---|---|---|---|
| Condition (1) | 0.051 | 0.077 | 0.039 |
| Condition (2) | 17.01 | 18.26 | 16.64 |

As can be understood from Table 4, each embodiment satisfies each condition. Furthermore, the various aberrations are relatively well suppressed.

According to the above description, a telephoto-type three-lens-group zoom lens system, with a small number of lens elements, which suitably corrects aberrations, can be obtained.

What is claimed is:

1. A zoom lens system comprising a positive first lens group, a positive second lens group, and a negative third lens group, in this order from an object;

wherein each of said three lens groups is independently moved, along the optical axis, upon zooming so that the distances therebetween become shorter; and wherein said zoom lens system satisfies the following relationships:

$$0.03 < (d_{12W} - d_{12T})/f_W < 0.15$$

$$16.64 \leq K_F < 20$$

wherein $d_{12W}$ designates the distance between the most image-side surface of said first lens group and the most object-side surface of said second lens group, at the short focal length extremity;

$d_{12T}$ designates the distance between the most image-side surface of said first lens group and the most object-side surface of said second lens group, at the long focal length extremity;

$f_W$ designates the focal length of the entire zoom lens system at the short focal length extremity;

$$K_F = (f_T/f_{FT})^2$$

$f_T$ designates the focal length of the entire zoom lens system at the long focal length extremity; and $f_{FT}$ designates the resultant focal length of said first lens group and said second lens group at the long focal length extremity.

2. The zoom lens system according to claim 1, wherein said first lens group and said second lens group, which move independently upon zooming, move integrally, along the optical axis, upon focusing.

3. The zoom lens system according to claim 1, wherein said first lens group comprises three lens elements, and said second lens group comprises two lens elements.

4. A focusing method for a zoom lens system comprising:

providing a positive first lens group, a positive second lens group, and a negative third lens group, in this order from an object;

independently moving said first lens group, said second lens group and said third lens group, along the optical axis, for zooming so that the distances therebetween become shorter; and integrally moving said first lens group and said second lens group, along the optical axis, upon focusing, wherein said zoom lens system satisfies the following condition:

$$10 < K_F < 20$$

wherein $$K_F = (f_T/f_{FT})^2$$

$f_T$ designates the focal length of the entire zoom lens system at the long focal length extremity; and $f_{FT}$ designates the resultant focal length of said first lens group and said second lens group at the long focal length extremity.

\* \* \* \* \*